United States Patent [19]

Lupke

[11] Patent Number: 5,466,402
[45] Date of Patent: Nov. 14, 1995

[54] GAP ADJUSTMENT OF A PLASTIC FLOW CHANNEL IN A PLASTIC PART FORMING DEVICE

[75] Inventor: Manfred A. A. Lupke, Thornhill, Canada

[73] Assignee: Corma Inc., Concord, Canada

[21] Appl. No.: 242,339

[22] Filed: May 13, 1994

[51] Int. Cl.⁶ ................................................ B29C 47/22
[52] U.S. Cl. .................... 264/39; 264/40.6; 264/209.2; 264/171.12; 425/133.1; 425/186; 425/192 R; 425/462; 425/381; 425/467
[58] Field of Search .................... 264/209.2, 209.8, 264/327, 519, 230, 39, 173, 40.6; 425/141, 466, 381, 467, 192 R, 133.1, 186, 462

[56] References Cited

U.S. PATENT DOCUMENTS

| | | | |
|---|---|---|---|
| 3,775,035 | 11/1973 | Scotto | 425/141 |
| 4,432,718 | 2/1984 | Wurzer | 425/381 |
| 4,464,104 | 8/1984 | Gneuss | 425/141 |
| 4,495,022 | 1/1985 | Viriyayuthakorn | 425/381 |
| 4,512,943 | 4/1985 | Hahn et al. | 425/381 |
| 4,548,570 | 10/1985 | Hahn et al. | 425/381 |
| 5,046,938 | 9/1991 | Hirschberger | 425/133.1 |
| 5,116,211 | 5/1992 | Shinmoto | 425/141 |
| 5,123,827 | 6/1992 | Lupke | 425/133.1 |
| 5,296,188 | 3/1994 | Lupke | 264/173 |
| 5,346,384 | 9/1994 | Hegler et al. | 425/381 |

FOREIGN PATENT DOCUMENTS

| | | | |
|---|---|---|---|
| 2350249 | 4/1975 | Germany | 425/381 |
| 52-42556 | 4/1977 | Japan | 264/40.5 |
| 62-238731 | 10/1987 | Japan | 264/209.8 |
| 62-238726 | 10/1987 | Japan | 425/466 |

*Primary Examiner*—Jeffery R. Thurlow

[57] ABSTRACT

A method of adjusting gap of a plastic flow channel is provided in a plastic forming device having a first body part adjacent one side of and adjustable relative to the channel and a second body part on which the first body part is mounted by a tight fitting between the first and second body parts. When the device is not in operation one of the body parts is subjected to a first temperature change producing a temporary temperature differential and a loosening of the fitting between the body parts. Positioning of the first body part on the second body part is adjusted while the fitting is loosened and then the one body part is subjected to a second temperature change opposite to the first temperature change to offset the temperature differential and restore the tight fitting between the body parts.

16 Claims, 4 Drawing Sheets

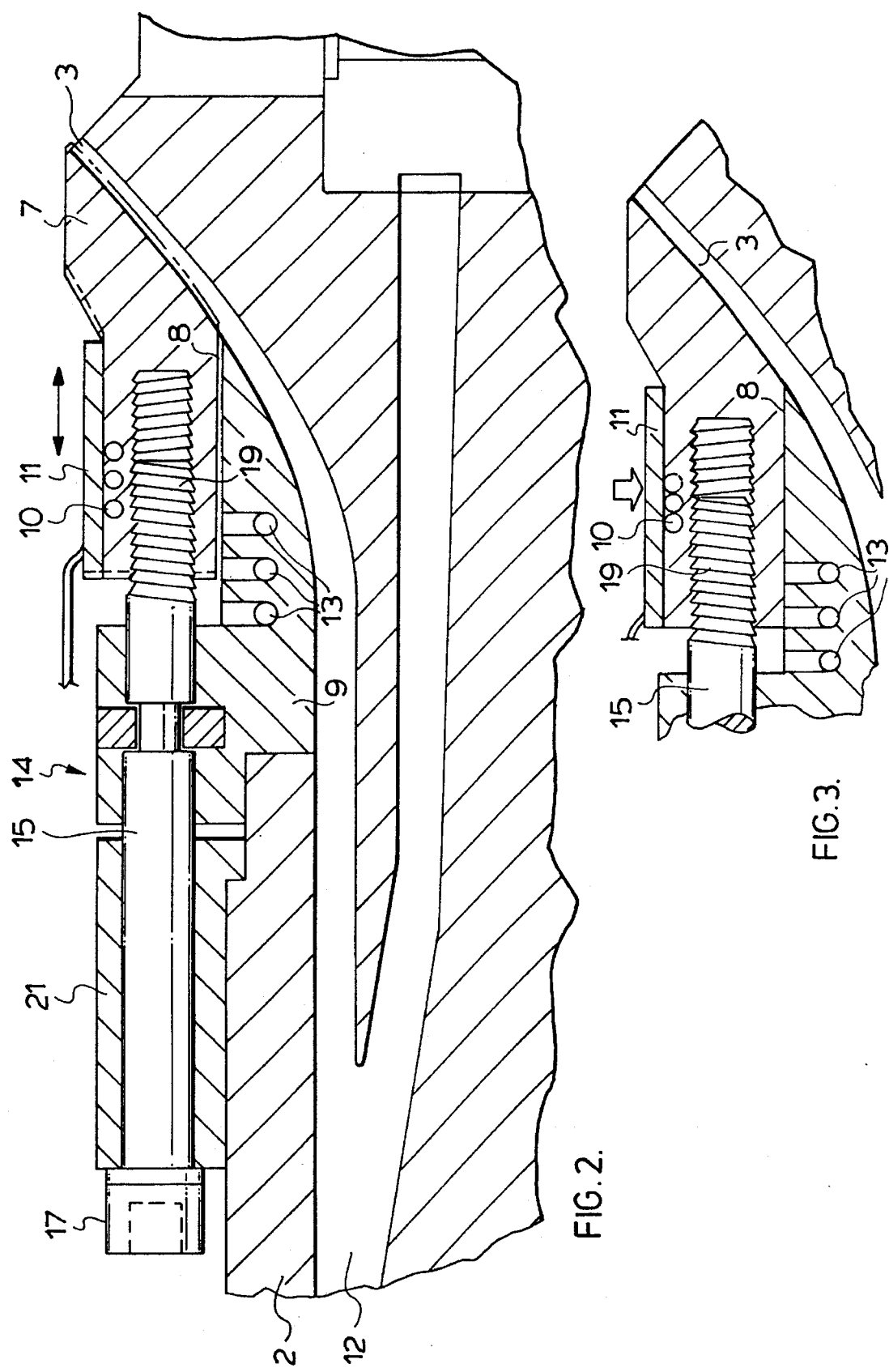

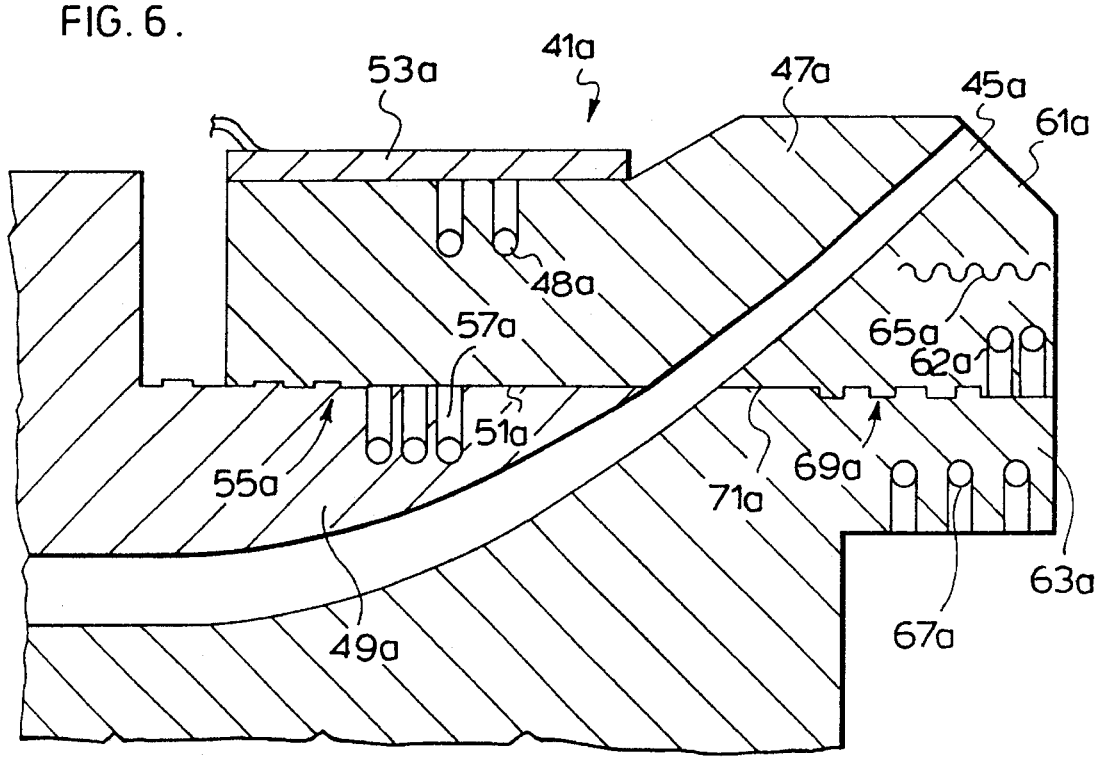

GAP ADJUSTMENT OF A PLASTIC FLOW CHANNEL IN A PLASTIC PART FORMING DEVICE

FIELD OF THE INVENTION

The present invention relates to a plastic forming device having an adjustable gap plastic flow channel.

BACKGROUND OF THE INVENTION

There are many different types of plastic forming devices including molding devices, extruder dies, extruder die tooling, injectors, etc.etc. These devices can be used to form thick plastic parts or they can be used to make products as thin as plastic film or the like. Typically these devices will have some type of a plastic flow channel which has a gap that is adjustable according the amount of plastic material desired to be flowed through the channel. However, for most of these devices, it is a complicated and time consuming effort to make the adjustment which generally requires shut down and disassembly of the components to make the gap adjustment.

One particular example of a plastic forming device is a die for the extrusion of plastic pipes which may be single walled, double walled, smooth walled or ribbed walled. PVC or polyvinylchloride is a preferred material for pipe construction. However, PVC is a material that can present potentially problems within a pipe die if the die is not set up properly.

More particularly, pipe dies have an adjustable gap extrusion channel with a part of the die which lies along one side of the channel being adjustable axially of the die to vary the gap of the channel. The movable part is mounted on a support for the part and it is extremely important that there by a tight fit between the part and its mount to ensure that PVC does not get trapped between the two parts where it would quickly degrade and result in potential problems such as burnouts and the like.

The conventional method of mounting an adjustable channel guide in a pipe die is by means of a mechanical interlock internally of the die. In order to make the channel gap adjustment with this type of an interlock requires a major internal disassembly of the components which then must be reassembled with one another or replaced with different parts to make the adjustment. This requires that the die be shut down for a job that might take a day or two. The die is then restarred and if the adjustment made is not satisfactory, then the whole process of disassembling and reassembling must be repeated until the correct adjustment has been made.

SUMMARY OF THE INVENTION

The present invention provides a plastic part forming device with features which enable a very simple yet efficient adjustment of the gap in the plastic flow channel of the device.

More specifically, a plastic part forming device of the present invention has an adjustable gap plastic flow path with a first body part adjacent one side of the plastic flow path and a second body part on which the first body part is mounted by a normally tight fitting between the two body parts. The device further includes a temperature control which produces a temporary temperature differential and loosens the tight fitting between the first and second body parts such that the first body part becomes movable on the second body part to adjust the gap of the plastic flow channel. After the adjustment has been made, the temporary temperature differential is offset to restore the tight fitting between the body parts. This can be done in one of two ways. It either occurs naturally over time or the temperature control can be designed to reverse the initial temperature change and speed up the restoring of the tight fitting between the body parts.

The plastic forming device of the present invention does not use mechanical interlocks as found in the prior art constructions and therefore does not require the internal disassembly and re-assembly of the parts as noted above. Contrary to the day or two job for adjusting gap in a conventional plastic forming device such as a pipe die the device of the present invention can be gap adjusted at the flow channel in a mere matter of hours.

BRIEF DESCRIPTION OF THE DRAWINGS

The above as well as other advantages and features of the present invention will be described in greater detail according to the preferred embodiments of the present invention in which;

FIGS. 2 and 3 are further sectional views showing an enlargement of one of the plastic flow channel regions from the die of FIG. 1;

FIG. 6 is a sectional view of a further extruder die according to another preferred embodiment of the present invention.

DETAILED DESCRIPTION ACCORDING TO THE PREFERRED EMBODIMENTS OF THE PRESENT INVENTION

Figure 1:
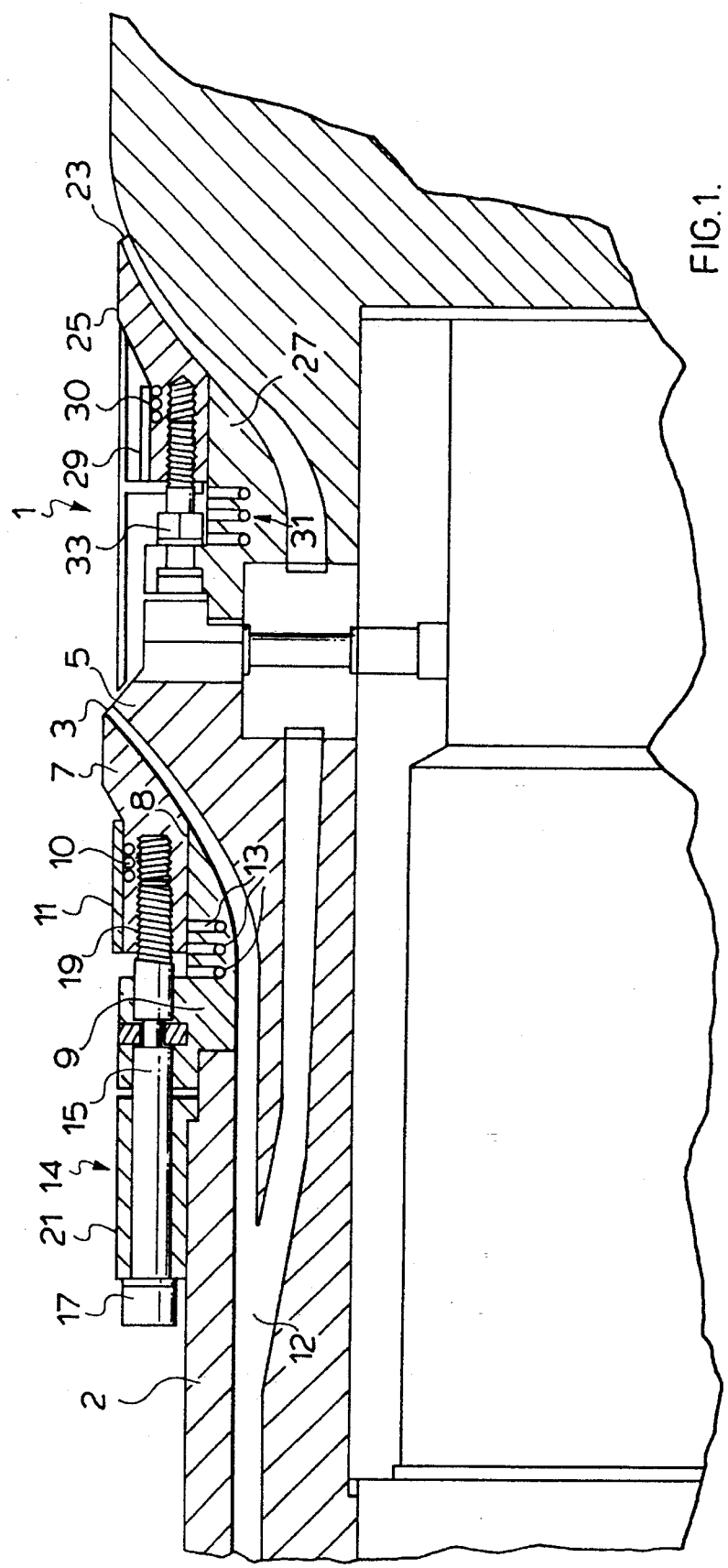
FIG. 1 is a sectional view through the flow channel region of a plastic forming device and in particular a pipe forming die in accordance with a preferred embodiment of the present invention.

FIG. 1 shows the plastic flow region of an extrusion die generally indicated at 1 used in the formation of double walled pipe. This extrusion die exemplifies the concept of the present invention and it is to be appreciated that other plastic forming devices including different types of molds, extruder dies and extruder die tooling, injectors, etc. having some type of a variable gap plastic flow passage can also benefit from the features of the present invention.

Returning once again to FIG. 1, die 1 is provided with a pair of extrusion channels or orifices 3 and 23 both of which are fed by a common plastic flow line 12. Plastic in a heated state moves through line 12 to the respective channels 3 and 23 to form two separate walls in a double walled pipe.

Each of the channels 3 and 23 are adjustable in gap, i.e. width of the channel, according to the thickness of pipe wall desired. In the case of the upstream channel 3, it is bordered to the inside by inside caliber 5 and to the outside by outside caliber 7. Caliber 7 is movably mounted on a caliber support 9 which is in turn fixed to the nozzle 2 of the die. Channel 3 extends at an angle to the length of the die and caliber 7 has an angled interior face along the channel. Therefore, axial movement of the caliber either opens or closes the gap of the channel.

As earlier described, PVC is the preferred material in the manufacture of many different types of pipes. However, it is very important that no PVC be trapped in a dead area within the die. In particular, PVC material cannot be allowed to enter at the interface 8 between caliber 7 and caliber mount 9. Accordingly, the caliber is secured by a very tight fitting with no or essentially no clearance between it and the caliber mount.

In the set up of FIG. 1, caliber 7 is secured by a friction fit to the caliber mount. This friction fit is so tight that none of the plastic material is allowed to enter the interface area 8. Furthermore, under normal usage of the die, caliber 7 is totally immovable relative to its mount. However, the die is provided with features which do allow adjustment of the caliber and therefore adjustment of the gap in the extrusion channel 3 as follows.

An electrical heater 11 in the form of a jacket or heater band is provided to the outside of caliber 7. When it is desired to move the caliber, i.e. to either open or close the gap of the plastic flow channel, the heater is turned on which in turn heats the caliber. The caliber which has an all metal or least substantially all metal construction absorbs the heat energy and expands relative to the caliber mount which remains essentially unaffected by the heat generated directly in the caliber. As shown in FIG. 2 of the drawings, this creates a gap at the interface 8 between the caliber and its mount which then allows the caliber to be slid axially of the die to either open or close the extrusion channel gap.

The actual adjustment of the caliber can be achieved in many different types of manners. In the particular embodiment shown in FIGS. 1 through 3 of the drawings, a threaded adjustment system generally indicated at 14 is provided for movement of the caliber. This adjustment system comprises elongated bolt 15 which threads at 19 into the caliber 7. The bolt is fitted through a bolt support 21 which is fixedly secured to the nozzle 2. The head of the bolt 17 is exposed for rotating the bolt. The bolt itself does not move but rather the caliber is slid either forwardly or rearwardly by virtue of the fact that it is threaded onto the end of the bolt.

Once the desired positioning of the caliber has been achieved, it is important to once again reestablish the tight fitting of the caliber on its caliber mount to eliminate any gap at the interface 8. This is achieved by a simple cooling of the caliber to shrink it back on to its mount. In the particular embodiment shown, a series of channels or bores 10 are provided and a cooling medium is passed through these bores to offset or eliminate the temperature differential between the caliber and its mount. Accordingly, the heat energy is taken out of the caliber which causes it to contract and shrink back onto the mount eliminating any gap at the interface 8.

A similar set up is provided at the downstream extrusion channel 23 which is bordered to one side by a metallic caliber 25. This caliber is movably supported on a caliber mount 27. Heater band 29 is provided to one side of the caliber and cooling channels 31 are provided to the other side of the caliber. A threaded adjustment system 33 is provided for adjusting position of the caliber 25 once it has been heated by heater band 29 and loosened relative to its caliber mount. After the position of caliber 25 has been adjusted, it is cooled by a cooling medium which flows through cooling channels or bores 30.

It is to be appreciated that the cooling channels or bores 10 and 30 are not necessarily required because after a certain amount of time, each of the calibers will give off their heat energy and shrink back to their normal tight fitting on their respective caliber mounts. However, the provision of the cooling bores significantly reduces shrinkage time for the calibers.

A further feature of die 1 is the provision of second sets of cooling tubes 13 and 31 at the upstream and downstream caliber mounts 9 and 27 respectively. These cooling tubes are provided to cool the two caliber mounts at the same time as heat is generated in the calibers 7 and 25. This ensures that the caliber mounts do not heat up with the calibers which would otherwise inhibit the loosening of the fitting between the calibers and the mounts.

In some instances, it is not necessary to use the cooling tubes 13 and 31 because there is not sufficient heat transfer from the calibers to the caliber mounts to resist loosening of the fit between the two.

The fundamental concept of the present invention is one in which a temperature differential is produced between a movable part and the part on which it is mounted for varying the gap of a plastic flow channel. Accordingly, the present invention can also work for example by initially cooling each of the caliber mounts 9 and 27 which would also have a metallic construction causing them to shrink inwardly relative to the two calibers without having to heat the calibers and in this manner loosen the fit between the calibers and their mounts. The two calibers could then be adjusted and following the adjustment the caliber mounts would be allowed to expand to their normal size for supporting the calibers. The heating of the caliber mount could occur naturally or could be achieved by separate heaters provided in the caliber mounts.

Figure 4:
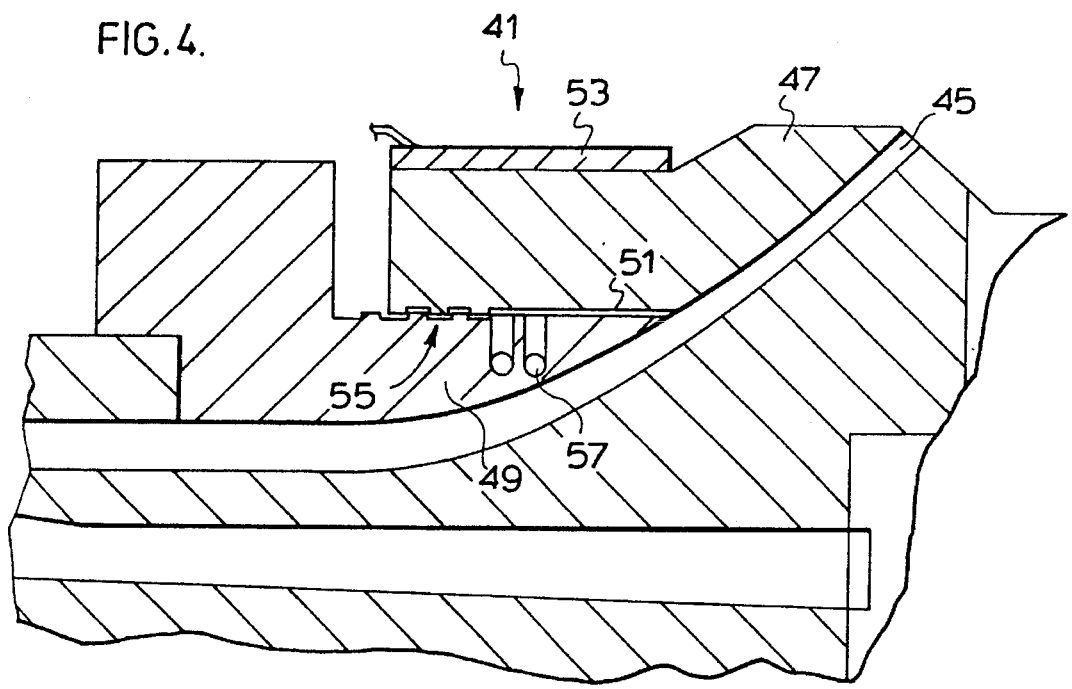
FIGS. 4 and 5 are sectional views through a die having an adjustable flow channel using a different channel gap adjustment from that shown in FIGS. 1 through 3 of the drawings.
Figure 5:
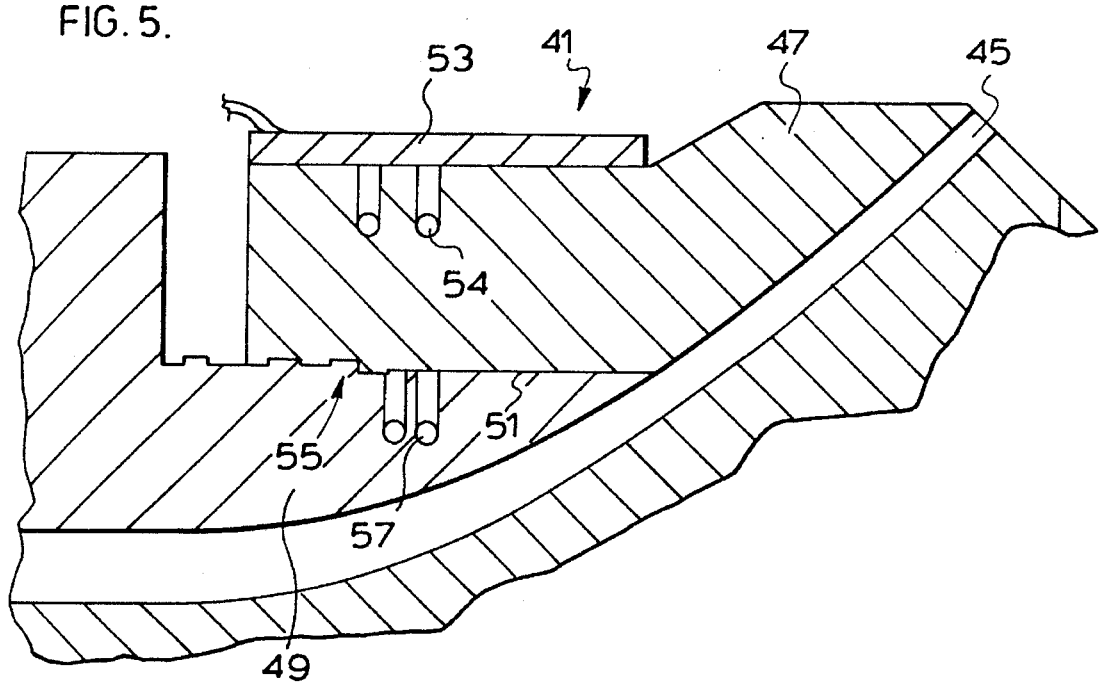

FIGS. 4 and 5 show a section from a die 41 modified from the earlier described die. In this particular die, an adjustable gap extrusion channel 45 is provided. One side of the channel is bordered by caliber 47 which is movable to either open or close the gap through the channel. Caliber 47 is normally tightly fitted on its caliber mount 49. The interface between the caliber and its mount is indicated at 51.

A heater 53 is provided for heating of the caliber which as shown in FIG. 4 of the drawings, expands the caliber and loosens the fit at the interface 51 between the caliber and its mount. A threaded adjustment 55 is provided directly between the caliber and its mount and rather than using a separate threaded control, the caliber which is in the form of a collar around the die is threaded on the mount to either open or close the gap in the channel. Cooling tubes 54 are provided to cool the caliber 47 after the adjustment is made and to shrink it back onto the caliber mount closing the gap at interface 51 as shown in FIG. 5 of the drawings.

FIG. 6 of the drawings shows a section of an extruder die 41a having similar features as well as features in addition to die 41 of FIG. 4 and 5.

Die 41a has an extrusion passage 45a bordered by outside caliber 47a and inside caliber 61a. A heater 53a is provided to the outside caliber which is threadably adjustable by adjustment 55a on its caliber mount 49a when the fitting is loosened between the two at interface 51a. Cooling tubes 57a are provided in caliber mount 49a to assist in the loosening of the fitting of the outside caliber if necessary. Cooling tubes 48a are provided to cool caliber 47a after the adjustment is made.

In the FIG. 6 setup, inside caliber 61a which also borders one side of extrusion passage 45 is additionally movable to adjust the gap of the passage. The inside caliber is supported on caliber mount 63a with the interface between the two being indicated at 71a. Caliber 61 is fitted with a heater 65a and a thread adjustment 69a is provided to axially adjust positioning of the inside caliber after it has been heated and loosened on its mount. Cooling tubes 67a are provided to cool and shrink the inside caliber mount 63a if necessary to assist in loosening of the fitting. Cooling tubes 62a are provided to cool caliber 61a and to restore its tight fitting to the caliber mount 63a after adjusting position of the inside caliber.

It is to be understood that many other types of adjustment systems can be used equally as well for adjusting the position of a moving caliber on an extrusion die or to move any other type of gap adjustment part on any type of plastic forming device having a gap adjustable plastic flow path.

The inside caliber can be adjusted by cooling the inside caliber mount to shrink it without heating the caliber itself. This again loosens the fitting of the caliber on its mount.

FIG. 6 demonstrates that the flow passage can be adjusted at the upstream outside, at the downstream inside or at both sides of the passage. Furthermore, it is once again to be understood that the inside caliber can be adjusted by different types of adjustment systems different from that shown in FIG. 6.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of adjusting gap of a plastic flow channel in a plastic part forming device settable to an operative mode for the production of plastic parts and also settable to an inoperative mode when such production is discontinued, said device having a first body part adjacent one side of and adjustable relative to the channel, and a second body part on which the first body part is mounted by a tight fitting between the first and second body parts, said method comprising subjecting one of said body parts to a first temperature change only when said device is in the inoperative mode producing a temporary temperature differential and a loosening of the fitting between the body parts, adjusting positioning of said first body part on said second body part while the fitting is loosened and then subjecting the one body part to a second temperature change opposite to said first temperature change which offsets the temperature differential and restores the tight fitting which is maintained between the body parts when said device is in the operative mode.

2. A method as claimed in claim 1 comprising heating and expanding the first body part relative to the second body part to loosen the fitting between the body parts and then cooling and contracting the first body part relative to the second body part to restore the tight fitting between the body parts.

3. A method as claimed in claim 1, comprising cooling the second body part relative to the first body part to loosen the fitting between the body parts and then heating the second body part relative to the first body part to restore the tight fitting between body parts.

4. A method as claimed in claim 1, wherein said first body part is slid along said second body part by a screw control for adjusting positioning of said first body part on said second body part.

5. A plastic part forming device which is settable to an operative mode for the production of plastic parts and also settable to an inoperative mode in which such production is discontinued, said device having an adjustable gap liquid plastic flow path, a first body part adjacent one side of said liquid flow path, and a second body part on which the first body part is mounted by a fitting which is tight and prevents movement between said first and second body parts when said device is in the operative mode, said device including a temperature control in one of said body parts and which is only activated when said device is in the inoperative mode to produce a temperature differential and a loosening of the fitting between said first and second body parts such that said first body part is movable on said second body part to adjust the gap of the plastic flow path.

6. A device as claimed in claim 5, wherein said temperature control includes first and second temperature changing members which produce and then offset the temperature differential between said first and second body parts.

7. A plastic part forming device as claimed in claim 6, wherein said first temperature changing member comprises a heater member which heats and expands said first body part relative to said second body part, and said second temperature changing member comprises a cooling member which cools said first body part relative to said second body part.

8. A plastic part forming device as claimed in claim 5, wherein said temperature control comprises a heater which heats said first body part and a first cooling member which cools said second body part to loosen the fitting and a second cooling member which cools said first body part to restore the tight fitting.

9. A plastic part forming device as claimed in claim 5, wherein said device comprises a pipe forming extrusion die and wherein said first part comprises a die caliber and said second part comprises a caliber mount, said liquid plastic flow path comprising an extrusion channel which extends at an angle to the length of said die, said caliber bordering one side of said extrusion channel and being movable axially of said die for adjusting gap of said extrusion channel.

10. A plastic part forming device as claimed in claim 9, including a threaded adjustment member extending and fixed axially of said die, said threaded member being threaded into and adjusting position of said caliber on said die.

11. A plastic forming device as claimed in claim 9, wherein said caliber comprises a collar outwardly around said die and is threadably secured to said caliber mount for adjustment of said caliber.

12. A plastic part forming device as claimed in claim 9, including a heater on said caliber which heats and expands said caliber relative to said caliber mount to loosen the normally tight fitting between said caliber and said caliber mount.

13. A plastic part forming device as claimed in claim 9, including cooling bores through which a cooling medium is fed and cools said caliber which offsets the temperature differential and restores the tight fitting between said caliber and said caliber mount.

14. A plastic part forming device as claimed in claim 9, wherein said extrusion die has first and second extrusion channels axially offset from one another along said die and first and second axially adjustable calibers bordering said first and second extrusion channels.

15. A plastic part forming device as claimed in claim 9, wherein said die caliber is located upstream and to the outside of said extrusion channel.

16. A plastic part forming device as claimed in claim 9, wherein said die caliber is located downstream and to the inside of said extrusion channel.

* * * * *